United States Patent
Lam et al.

(10) Patent No.: US 11,922,011 B2
(45) Date of Patent: Mar. 5, 2024

(54) VIRTUAL MANAGEMENT UNIT SCHEME FOR TWO-PASS PROGRAMMING IN A MEMORY SUB-SYSTEM

(71) Applicant: MICRON TECHNOLOGY, INC., Boise, ID (US)

(72) Inventors: Johnny A. Lam, Firestone, CO (US); Samyukta Mudugal, Erie, CO (US); Sanjay Subbarao, Irvine, CA (US); Byron D. Harris, Mead, CO (US); Daniel A. Boals, Broomfield, CO (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 17/464,442

(22) Filed: Sep. 1, 2021

(65) Prior Publication Data
US 2023/0061180 A1  Mar. 2, 2023

(51) Int. Cl.
*G06F 3/06* (2006.01)

(52) U.S. Cl.
CPC .......... *G06F 3/0604* (2013.01); *G06F 3/0655* (2013.01); *G06F 3/0679* (2013.01)

(58) Field of Classification Search
CPC ...... G05B 13/00–048; G05B 15/00–02; G05B 17/00–02; G06F 1/00–3296;
(Continued)

(56) References Cited

U.S. PATENT DOCUMENTS

| | | | | |
|---|---|---|---|---|
| 5,838,614 A | * | 11/1998 | Estakhri | G06F 3/061 365/185.11 |
| 6,725,321 B1 | * | 4/2004 | Sinclair | G06F 3/064 365/185.29 |

(Continued)

OTHER PUBLICATIONS

H. Takayashiki, M. Sato, K. Komatsu and H. Kobayashi, "Page-Address Coalescing of Vector Gather Instructions for Efficient Address Translation," 2022 IEEE/ACM Workshop on Irregular Applications: Architectures and Algorithms (IA3), Dallas, TX, USA, 2022, pp. 1-8, doi: 10.1109/IA356718.2022.00007. (Year: 2022).*

(Continued)

*Primary Examiner* — Daniel C. Chappell
(74) *Attorney, Agent, or Firm* — Lowenstein Sandler LLP

(57) ABSTRACT

A data item is programmed to a first set of management units (MUs) associated with a first portion of one or more memory devices. The first portion includes memory cells of a first type. The first set of MUs is associated with a first physical address. A mapping is generated in a virtual MU data structure that associates the first physical address with a set of virtual MUs associated with the one or more memory devices. An entry associated with the data item is added to a logical-to-physical (L2P) table associated with the one or more memory devices. The entry includes an identifier associated with the set of virtual MUs associated with the one or more memory devices. A detection is made that the data item is programmed to a second set of MUs associated with a second portion of the one or more memory devices. The second portion includes memory cells of a second type. The second set of MUs is associated with a second physical address. The mapping is updated to associate the set of virtual MUs with the second physical address.

19 Claims, 7 Drawing Sheets

(58) Field of Classification Search
CPC .............. G06F 3/00; G06F 3/06–0689; G06F 5/00–16; G06F 8/00–78; G06F 9/00–548; G06F 11/00–3696; G06F 12/00–16; G06F 13/00–4295; G06F 15/00–825; G06F 16/00–986; G06F 17/00–40; G06F 21/00–88; G06F 2009/3883; G06F 2009/45562–45595; G06F 2015/761–768; G06F 2201/00–885; G06F 2206/00–20; G06F 2209/00–549; G06F 2211/00–902; G06F 2212/00–7211; G06F 2213/00–4004; G06F 2216/00–17; G06F 2221/00–2153; G06K 9/00–6298; G06N 3/00–126; G06N 5/00–048; G06N 7/00–08; G06N 10/00; G06N 20/00–20; G06N 99/00–007; G06T 1/00–60; G06V 30/00–43; G11B 20/00–24; G11B 33/00–1493; G11C 11/00–5692; G11C 13/00–06; G11C 14/00–009; G11C 15/00–06; G11C 16/00–3495; G11C 17/00–18; G11C 2207/00–229; G11C 2216/00–30; H01L 25/00–50; H01L 27/00–3293; H01L 2225/00–1094; H03M 7/00–707; H04L 9/00–38; H04L 12/00–66; H04L 41/00–5096; H04L 49/00–9094; H04L 61/00–59; H04L 67/00–75

See application file for complete search history.

(56) References Cited

U.S. PATENT DOCUMENTS

| | | |
|---|---|---|
| 9,817,593 B1 | 11/2017 | Inbar et al. |
| 2005/0141312 A1 | 6/2005 | Sinclair et al. |
| 2010/0082888 A1* | 4/2010 | Mitsunaga .......... G06F 12/0246 |
| | | 711/E12.001 |
| 2012/0017039 A1* | 1/2012 | Margetts ............. G06F 12/0802 |
| | | 711/E12.007 |
| 2017/0017580 A1* | 1/2017 | Wilkerson .............. G06F 3/061 |
| 2017/0062045 A1* | 3/2017 | Wilson ................... G11C 16/26 |
| 2017/0262228 A1* | 9/2017 | Kanno ................. G06F 3/0616 |
| 2019/0034105 A1* | 1/2019 | Natarajan ............... G06F 3/061 |
| 2019/0095116 A1* | 3/2019 | Igahara ................ G06F 3/0634 |
| 2019/0253520 A1* | 8/2019 | Maharana ................ G06N 3/08 |
| 2019/0286328 A1 | 9/2019 | Parthasarathy et al. |
| 2020/0089620 A1* | 3/2020 | Hsu ...................... G06F 12/1009 |
| 2020/0194064 A1* | 6/2020 | Barndt ................. G11C 29/781 |
| 2020/0310643 A1* | 10/2020 | Li ............................ G06F 3/061 |
| 2021/0103389 A1 | 4/2021 | Parthasarathy et al. |
| 2021/0181955 A1 | 6/2021 | Mohammadzadeh et al. |
| 2021/0303175 A1* | 9/2021 | Saga ...................... G06F 3/0631 |
| 2022/0155999 A1* | 5/2022 | Sikarwar ............... G06F 3/0659 |

OTHER PUBLICATIONS

PCT International Search Report and Written Opinion for International Application No. PCT/US2022/042390, dated Dec. 26, 2022, 10 pages.

* cited by examiner

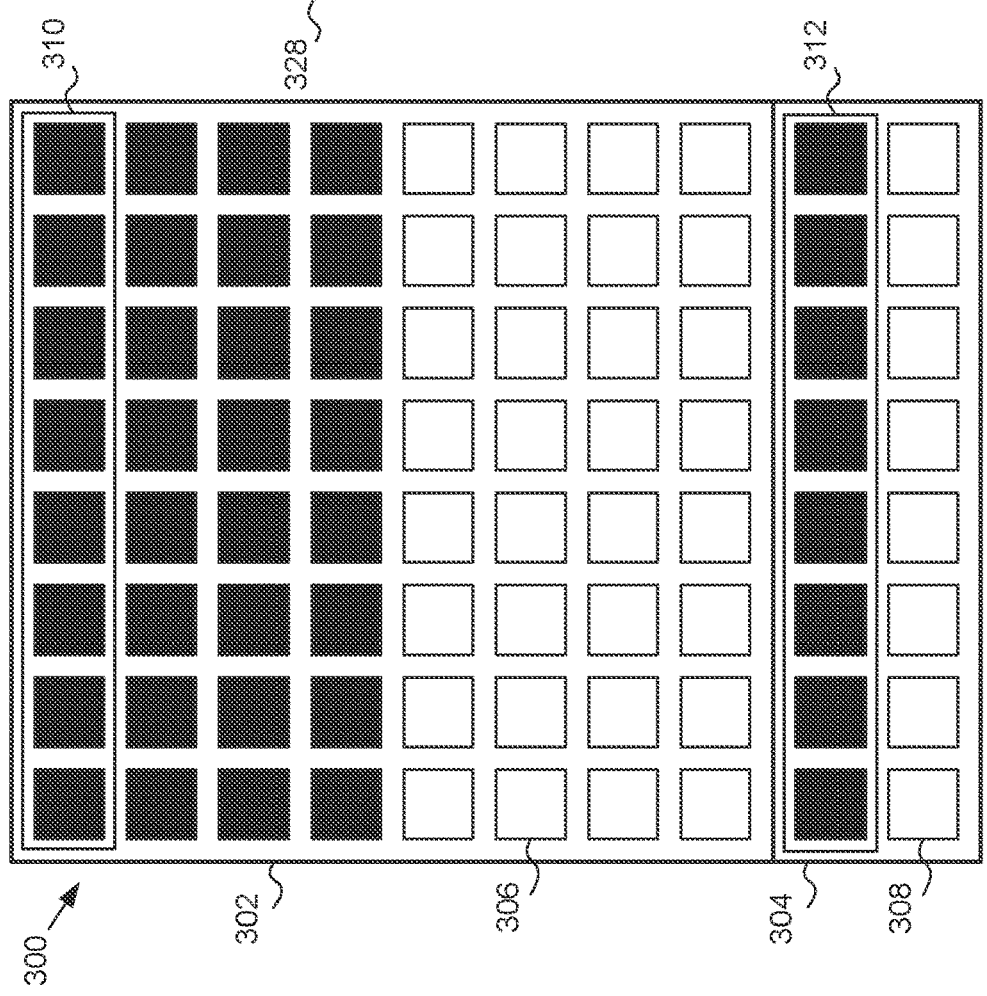

| LOGICAL-TO-PHYSICAL ADDRESS TABLE 370 | |
|---|---|
| LOGICAL ADDR 372 | PHYSICAL ADDR 374 |
| 0 | 0x0000 |
| 1 | 0x0002 |
| 2 | 0x0003 |
| 3 | 0x0001 |

| VIRTUAL MU DATA STRUCTURE 320 | | |
|---|---|---|
| VMU ID 322 | PHYSICAL MU ID 324 | ACCESS MODE 326 |
| 0 | 50 | QLC |
| 1 | 50 | QLC |
| 2 | 50 | QLC |
| 3 | 50 | QLC |

VIRTUAL MANAGEMENT UNIT SCHEME FOR TWO-PASS PROGRAMMING IN A MEMORY SUB-SYSTEM

TECHNICAL FIELD

Embodiments of the disclosure relate generally to memory sub-systems, and more specifically, relate to a virtual management unit (vMU) scheme for two-pass programming memory in a memory sub-system.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

FIGS. 3A-3F depict an example of a MU scheme for two pass programming at a memory sub-system, in accordance with some embodiments of the present disclosure.

DETAILED DESCRIPTION

Figure 1:
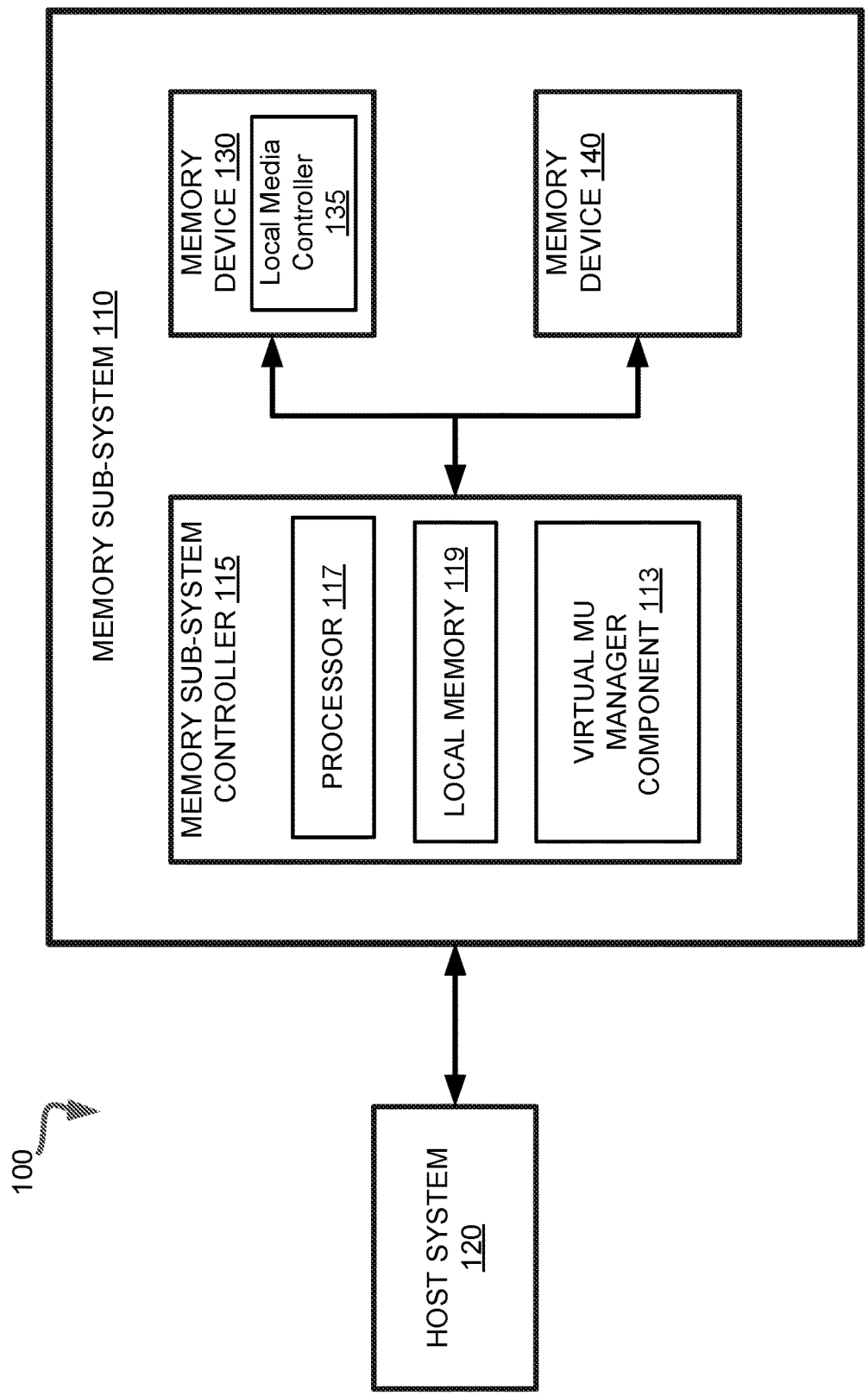
FIG. 1 illustrates an example computing system that includes a memory sub-system, in accordance with some embodiments of the present disclosure.

Aspects of the present disclosure are directed to a virtual management unit (vMU) scheme for two-pass programming in a memory sub-system. A memory sub-system can be a storage device, a memory module, or a combination of a storage device and memory module. Examples of storage devices and memory modules are described below in conjunction with FIG. 1. In general, a host system can utilize a memory sub-system that includes one or more memory components, such as memory devices that store data. The host system can provide data to be stored at the memory sub-system and can request data to be retrieved from the memory sub-system.

A memory sub-system can utilize one or more memory devices, including any combination of the different types of non-volatile memory devices and/or volatile memory devices, to store the data provided by the host system. In some embodiments, non-volatile memory devices can be provided by negative-and (NAND) type flash memory devices. Other examples of non-volatile memory devices are described below in conjunction with FIG. 1. A non-volatile memory device is a package of one or more dice. Each die can include one or more planes. A plane is a portion of a memory device that includes multiple memory cells. Some memory devices can include two or more planes. For some types of non-volatile memory devices (e.g., NAND devices), each plane includes a set of physical blocks. Each block includes a set of pages. "Block" herein shall refer to a set of contiguous or non-contiguous memory pages. An example of a "block" is an "erasable block," which is the minimal erasable unit of memory, while "page" is a minimal writable unit of memory. Each page includes a set of memory cells. A memory cell is an electronic circuit that stores information.

A memory device can include multiple memory cells arranged in a two-dimensional grid. The memory cells are formed onto a silicon wafer in an array of columns and rows. A memory cell includes a capacitor that holds an electric charge and a transistor that acts as a switch controlling access to the capacitor. Accordingly, the memory cell may be programmed (written to) by applying a certain voltage, which results in an electric charge being held by the capacitor. The memory cells are joined by wordlines, which are conducting lines electrically connected to the control gates of the memory cells, and bitlines, which are conducting lines electrically connected to the drain electrodes of the memory cells.

A block herein after refers to a unit of the memory device used to store data and can include a group of memory cells. One or more blocks can be grouped together to form a plane of the memory device in order to allow concurrent operations to take place on each plane. The memory device can include circuitry that performs concurrent memory page accesses of two or more memory planes. For example, the memory device can include a respective access line driver circuit and power circuit for each plane of the memory device to facilitate concurrent access of pages of two or more memory planes, including different page types.

Data operations can be performed by the memory sub-system. The data operations can be host-initiated operations. For example, the host system can initiate a data operation (e.g., write, read, erase, etc.) on a memory sub-system. The host system can send access requests (e.g., write command, read command) to the memory sub-system, such as to store data on a memory device at the memory sub-system and to read data from the memory device on the memory sub-system. The data to be read or written, as specified by a host request, is hereinafter referred to as "host data." A host request can include a logical address (e.g., a logical block address (LBA) and namespace) for the host data, which is the location that the host system associates with the host data. The logical address information (e.g., LBA, namespace) can be part of metadata for the host data. Metadata can also include error handling data (e.g., ECC codeword, parity code), data version (e.g. used to distinguish age of data written), valid bitmap (specifying which LBAs contain valid data), etc.

In order to isolate, from the host system, various aspects of physical implementations of memory devices employed by memory sub-systems, the memory sub-system can maintain a data structure that maps each logical address to a corresponding physical address. In some implementations, the physical address can include a channel identifier, a die identifier, a page identifier, a block identifier, a plane identifier and/or a frame identifier. The mapping data structure is referred to herein as a logical-to-physical (L2P) table.

With some types of memory (e.g., NAND), pages can be grouped to form blocks. Some types of memory, such as 3D cross-point, can group pages across dice and channels to form management units (MUs) (also referred to as logical units (LUNs)). Accordingly, each entry of the L2P table can reference one or more MUs, which can correspond to one or more pages (e.g., a set of pages crossing channel, die, and/or partition) that are grouped together for management purposes. The term "management unit" is utilized in the present disclosure to refer to both "management unit" and "super management unit" (which is a set of management units that are grouped together for management purposes), unless specifically noted otherwise.

Each L2P table entry can map a logical address to a physical address. The L2P table is maintained by the firmware of the memory sub-system controller and is stored on one or more non-volatile memory devices of the memory sub-system. In order to improve the overall efficiency of the data transfer between a host system and a memory sub-system, the L2P table can at least partially be cached by one or more volatile memory devices of the memory sub-system. The memory sub-system controller may implement appropriate cache management policies in order to manage eviction of cache entries.

Quadruple-level cell (QLC) memory devices (i.e., memory devices storing 4-bit value per cell) can introduce a two-pass programming scheme to mitigate program disturb. Program disturb refers to a phenomenon where a bit is unintentionally programmed from a "1" to a "0" (or vice-versa) during a page-programming event. The two-pass programming scheme introduced by QLC memory devices specifies that the same data is to be programmed to the same QLC memory twice, via a "first pass" (i.e., a first programming operation) and a "second pass" (i.e., a second programming operation). Data programmed to QLC memory is not available to service read operations after the first programming pass and is considered finalized and ready to service read operations after the second programming pass. As the data is programmed to QLC memory is not available to service read operations until the data is finalized after the second programming pass, the data can also be programmed to a single level cell (SLC) memory cache (i.e., a portion of memory that stores 1-bit value per cell). The data programmed to the SLC cache can be available to service read operations before the second programming pass for the data in QLC memory.

As described above, each L2P table entry can map a logical address associated with a data item (i.e., an atomic unit of data that is written to and/or read from a MU of the memory sub-system) to a physical address associated with a portion of a memory device of a memory sub-system that stores the data item. Accordingly, in systems that implement a two-pass programming scheme, a memory sub-system can update a L2P table entry for the data item to map a logical address associated with a data item with a physical address associated with the portion of the SLC cache that stores the data item after the first programming pass. After the second programming pass is complete (i.e., after the data item is finalized at QLC memory and is available to service reads), the memory sub-system controller can update the L2P table entry for the data item to map the logical address associated with the data item to a physical address associated with the portion of the QLC memory that stores the data item.

As described above, the L2P table is stored on one or more non-volatile memory devices of the memory sub-system and, in some systems, can be at least partially cached by one or more volatile memory devices of the memory sub-system. Accordingly, after each programming pass of the two-pass programming scheme for a data item, the L2P entry associated with the data item is updated at the one or more non-volatile memory devices and, in some instances, at the one or more volatile memory devices. A significant amount of memory sub-system resources (e.g., processing cycles, etc.) are consumed as the L2P table entry is updated at the non-volatile memory devices and the volatile memory devices after each programming pass of the two-pass programming scheme. Accordingly, fewer memory sub-system resources are available for other processes, which can significantly increase an overall system latency and decrease an overall system efficiency.

Aspects of the present disclosure address the above and other deficiencies by providing a virtual management unit (MU) scheme for two-pass programming memory devices. A host system can transmit a request to program a data item to a logical address associated with the memory device. In some embodiments, the logical address can correspond to a portion of a memory device that includes QLC memory. In some embodiments, the memory sub-system controller can also allocate a set of vMUs for the data item. Each of the set of vMUs can represent an abstracted MU that exists in a virtual memory space. In some embodiments, each of the set of vMUs can correspond to a virtual block. In such embodiment, the set of vMUs can correspond to one or more block stripes of the memory sub-system. The memory sub-system controller can maintain a vMU data structure for the memory sub-system. Each entry of the vMU data structure can store a mapping between the set of MUs at a portion of memory (e.g., SLC memory, QLC memory, etc.) that stores a data item with an indication of a set of vMUs allocated to the data item. In some embodiments, the vMU data structure can reside at one or more volatile memory devices of the memory sub-system. The memory sub-system can program the data item of the request to a portion of the SLC cache and a portion of QLC memory.

Responsive to programming the data item to the portion of the SLC cache, the memory sub-system controller can update an entry of the vMU data structure to include a mapping between the allocated set of vMUs and the physical address of the portion of the SLC cache that stores the data item. The memory sub-system controller can also update an entry of the L2P table of the memory sub-system to include a mapping between the logical address associated with the data item (e.g., as indicated in the request received from the host system) and the set of vMUs allocated to the data item, in some embodiments. In some embodiments, the memory sub-system controller can detect that the second programming pass for the data item at QLC memory is complete (i.e., the data item is finalized at QLC memory and is available to service reads). In such embodiments, the memory sub-system controller can update the entry of the vMU data structure associated with the data item to include a mapping between the allocated set of vMUs and physical address of the portion of QLC memory that stores the data item. As the entry of the L2P table already includes a mapping between the logical address associated with the data item and the set of vMUs allocated to the data item, the memory sub-system controller does not update the L2P table after completion of the second programming pass at QLC memory.

In some embodiments, the host system can transmit a request to access (e.g., read, etc.) the data item (e.g., before or after the second programming pass). The memory sub-system controller can identify an entry of the L2P table that corresponds to the data item and can determine of the set of vMUs allocated to the data item from the identified L2P table entry. The memory sub-system controller can then identify an entry of the vMU data structure that corresponds to the data item based on the determined set of vMUs and can determine, based on the set of MUs included in the identified entry, the physical address of the portion of SLC or QLC memory that stores the data item. The memory sub-system controller can execute a memory access operation (e.g., a read operation, etc.) to access the data item at the physical address of the portion of QLC memory, in accordance with the request.

Advantages of the present disclosure include, but are not limited to, providing a virtual management unit scheme that reduces the number of instances that an L2P table is updated during a two-pass programming process for a data item at a memory sub-system. Instead of storing a mapping between logical address associated with a data item and a physical address of a portion of memory that stores a data item at a L2P table, the memory sub-system can store a mapping between the logical address and a set of vMUs allocated to the data item at the L2P table. The vMU data structure residing at one or more volatile memory devices of the memory sub-system can be configured to store a mapping between the set of vMUs and the physical address of the portion of the SLC cache that stores the data item. After the second pass of the two-pass programming process, the memory sub-system controller can update the entry of the vMU data structure to indicate the physical address of the portion of QLC memory that stores the data item rather than updating the L2P table entry associated with the data item. Accordingly, each L2P table entry is only updated once during the two-pass programming process. By only updating each L2P table entry once during the two-pass programming process, a consumption of memory sub-system resources (e.g., process cycles) is significantly reduced. As a result, a significant amount of system resources are available for other processes, reducing overall system latency and increasing overall system efficiency.

FIG. 1 illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a combination of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory modules (NVDIMMs).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to multiple memory sub-systems 110 of different types. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), a double data rate (DDR) memory bus, Small Computer System Interface (SCSI), a dual in-line memory module (DIMM) interface (e.g., DIMM socket interface that supports Double Data Rate (DDR)), etc. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the physical host interface (e.g., PCIe bus). The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include a negative-and (NAND) type flash memory and write-in-place memory, such as a three-dimensional cross-point ("3D cross-point") memory device, which is a cross-point array of non-volatile memory cells. A cross-point array of non-volatile memory cells can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells. One type of memory cell, for example, single level cells (SLC) can store one bit per cell. Other types of memory cells, such as multi-level cells (MLCs), triple level cells (TLCs), quad-level cells (QLCs), and penta-level cells (PLCs) can store multiple bits per cell. In some embodiments, each of the memory devices 130 can include one or more arrays of memory cells such as SLCs, MLCs, TLCs, QLCs, PLCs or any combination of such. In some embodiments, a particular memory device can include an SLC portion, and an MLC portion, a TLC portion, a QLC portion, or a PLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as a 3D cross-point array of non-volatile memory cells and NAND type flash memory (e.g., 2D NAND, 3D NAND) are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, or electrically erasable programmable read-only memory (EEPROM).

A memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processing device, which includes one or more processors (e.g., processor 117), configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130. The memory sub-system controller 115 can be responsible for other operations such as wear leveling operations, garbage collection operations, error detection and error-correcting code (ECC) operations, encryption operations, caching operations, and address translations between a logical address (e.g., a logical block address (LBA), namespace) and a physical address (e.g., physical block address) that are associated with the memory devices 130. The memory sub-system controller 115 can further include host interface circuitry to communicate with the host system 120 via the physical host interface. The host interface circuitry can convert the commands received from the host system into command instructions to access the memory devices 130 as well as convert responses associated with the memory devices 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, memory sub-system 110 is a managed memory device, which is a raw memory device 130 having control logic (e.g., local controller 132) on the die and a controller (e.g., memory sub-system controller 115) for media management within the same memory device package. An example of a managed memory device is a managed NAND (MNAND) device.

The memory sub-system 110 includes a vMU manager component 113 that can manage redundancy data generated for host data stored at one or more portions of a memory device 130, 140. In some embodiments, the memory sub-system controller 115 includes at least a portion of the vMU manager component 113. For example, the memory sub-system controller 115 can include a processor 117 (processing device) configured to execute instructions stored in local memory 119 for performing the operations described herein. In some embodiments, the vMU manager component 113 is part of the host system 120, an application, or an operating system.

VMU manager component 113 can be configured to implement a vMU scheme for two-pass programming at memory sub-system 110. In some embodiments, one or more portions of memory devices 130, 140 can include single level memory cells (SLCs) (referred to herein as a SLC portion). As described above, a SLC refers to a portion of memory that is configured to store 1-bit per memory cell. One or more additional portions of memory devices 130, 140 can include memory that is configured to store more than 1-bit per memory cell. For example, the one or more additional portions of memory devices 130, 140 can include one or more QLCs memory cells.

Memory sub-system controller 115 can receive a request from host system 120 to store a data item to the QLC portion of a memory device 130, 140, in some embodiments. Memory sub-system controller 115 can program the data item to a cache residing at the SLC portion of a memory device 130, 140 (referred to herein as a SLC cache) and to the QLC portion of memory device 130, 140, in accordance with a two-pass programming scheme associated with QLC memory. Responsive to detecting that memory sub-system controller 115 has programmed the data item to the SLC cache, vMU manager component 113 can allocate a set of vMUs to the data item and generate a mapping between the set of vMUs and a physical address associated with the set of MUs of the SLC cache that store the data item. In some embodiment, the vMU manager component 113 can store the generated mapping at a vMU data structure, in accordance with embodiments described herein. VMU manager component 113 can also update an entry of a L2P table associated with memory device 130, 140 to include a mapping between a logical address associated with the data item and an indication of the set of vMUs allocated to the data item. Responsive to detecting that the second programming pass of the two-pass programming scheme is complete (i.e., that the data item programmed to the QLC portion of memory device 130, 140 is finalized and available to service read requests), vMU manager component 113 can update the mapping associated with the data item at the vMU data structure to associate the set of vMUs allocated to the data item with a physical address associated with a set of MUs of the QLC portion of memory device 130, 140 that store the data item. In response to receiving a request from host system 120 to access the data item, vMU manager 113 can identify the portion of memory devices 130, 140 that store the data item using the L2P table and the vMU data structure, in accordance with embodiments provided below. Further details regarding the vMU scheme for two-pass programming are provided herein.

Figure 2:
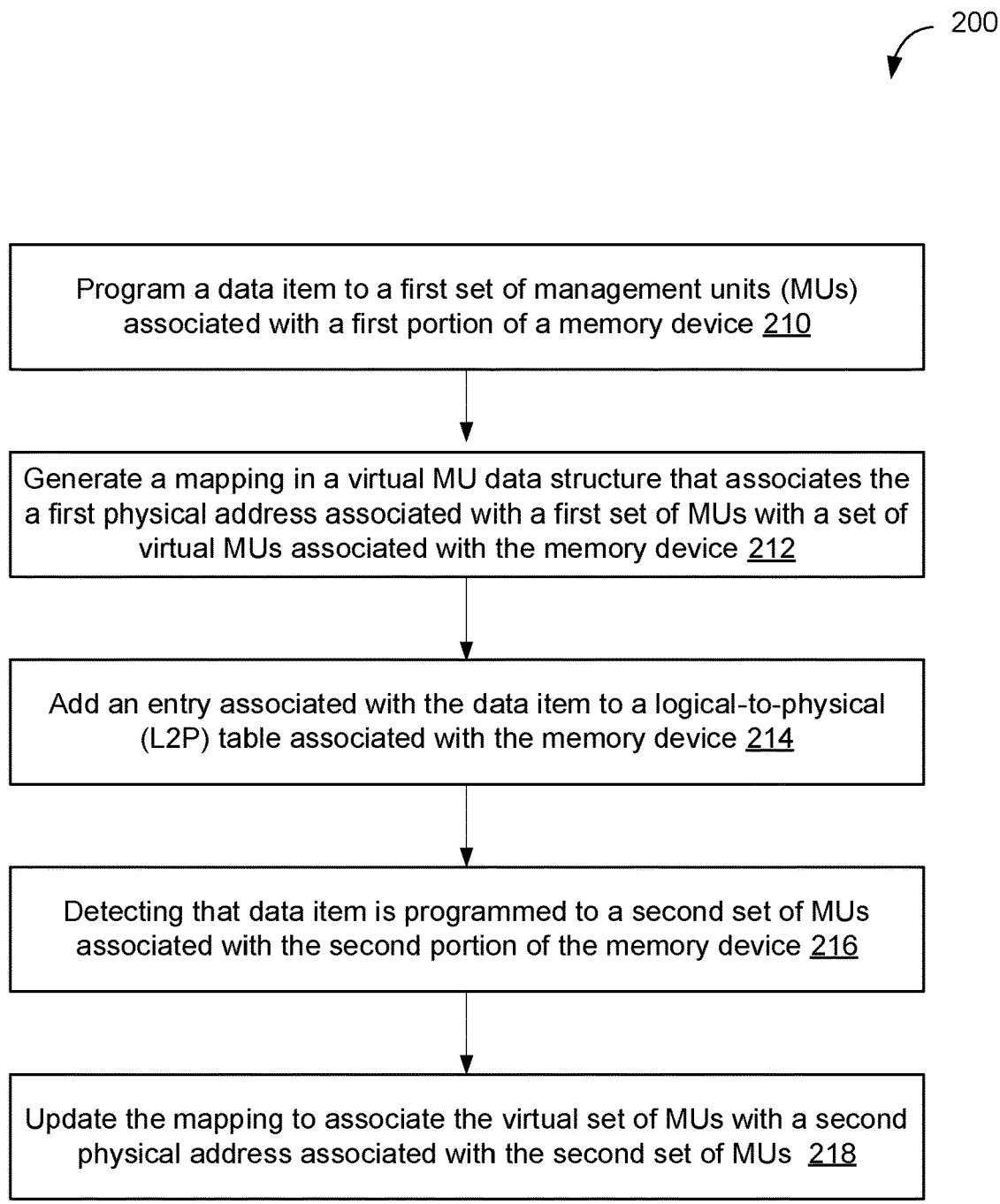
FIG. 2 is a flow diagram for an example method for implementing a virtual management unit (MU) scheme for two pass programming at a memory sub-system, in accordance with some embodiments of the present disclosure.

FIG. 2 is a flow diagram of an example method 200 for implementing a virtual management unit (vMU) scheme for two pass programming at a memory sub-system, in accordance with some embodiments of the present disclosure. The method 200 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 200 is performed by the vMU manager component 113 of FIG. 1. In other or similar embodiments, one or more operations of method 200 is performed by another component of the memory sub-system controller 115, or by a component of local media controller 135. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At block 210, processing logic programs a data item to a first set of management units (MUs) associated with a first portion of one or more memory devices. In some embodiments, the one or more memory devices can correspond to memory 300, as illustrated in FIG. 3A. In some embodiments, memory 300 can correspond to one or more memory devices 130, 140, described above. As illustrated in FIG. 3A, memory 300 can include a first portion 302 and a second portion 304. The first portion 302 of memory 300 can include memory cells 306 of a first type and the second portion 304 can include memory cells 308 of a second type. For example, first portion 302 can include single level cells (SLCs) and second portion 304 can include one or more of multi-level cells (MLCs), triple-level cells (TLCs), or quadruple-level cells (QLCs). In an illustrative example, first portion 302 can include SLCs and second portion 304 can include QLCs. In one embodiment, the first portion 302 of memory 300 can reside on one or more memory devices 130, 140 and the second portion 302 of memory 300 can reside on one or more additional memory devices 130, 140. In other or similar embodiments, the first portion of memory 300 can reside on a single memory device 130, 140 and the second portion of memory 300 can reside on the same memory device 130, 140.

As described above, vMU manager component 113 can be configured to implement a two-pass programming scheme to program data items to one or more MUs (e.g., memory pages, blocks, planes, die, etc.) of the second portion 304 of memory 300, in some embodiments. In such embodiments, memory cells 306 of the first portion 302 of memory 300 can be allocated as part of a memory cache (e.g., a SLC cache) for memory sub-system 110. The memory cache can be configured to temporarily store data that is being programmed to the second portion 304 of memory 300 before the second pass of the two-pass programming scheme is complete. In some embodiments, vMU manager component 113 can receive a request from host system 120 to program data, including the data item, to a QLC portion (i.e., second portion 304) of memory 300. Processing logic can program the data item to a first set of MUs at the first portion 302 and a second set of MUs at the second portion 304. Each set of MUs can be associated with a respective physical address (e.g., a page identifier, a page stripe identifier, a block identifier, a block stripe identifier, etc.) of memory device 110.

Referring back to FIG. 2, at block 212, processing logic generates a mapping that associates the first physical address associated with a first set of MUs with a set of vMUs associated with memory sub-system 110. In some embodiments, processing logic can generate the mapping responsive to determining that the data item is programmed to the first set of MUs, even if the first pass of programming the data item the second set of MUs is not complete. In some embodiments, processing logic can add the generated mapping to one or more entries of a vMU data structure, such as vMU data structure 320 of FIG. 3B. VMU data structure 320 can be a data structure configured to store mappings between a set of MUs of memory 300 that store a respective data item and a set of vMUs allocated to the data item. In some embodiments, vMU data structure 320 can reside at one or more volatile memory devices of memory sub-system 110.

Each entry of vMU data structure 320 can correspond to a respective set of vMUs (e.g., a block stripe, a page stripe, etc.) of memory 300. In some embodiments, each entry of data structure 320 can include a vMU identifier (ID) field 322 that includes an identifier of a set of vMUs allocated to a respective data item and a physical MU identifier field 324 that includes an identifier of a set of MUs that stores the respective data item. In some embodiments, vMU manager component 113 can generate a new entry of vMU data structure 320 in response to determining that a new set of MUs (e.g., a block stripe) is made available to host data (e.g., by memory sub-system controller 115, etc.) at memory 300. For example, prior to or after receiving the request to program a data item to the QLC portion of memory 300, vMU manager component 113 can determine that block stripe 310 is opened at memory 300 and can generate a new entry of data structure 320. VMU manager 113 can allocate a set of vMUs to the data item and generate the mapping between the allocated set of MUs and a first set of MUs by updating the physical MU ID field 324 of the generated entry to include an identifier associated with the first set of MUs.

As illustrated in FIG. 3B, vMU manager 113 can generate a mapping for a data item programmed to the SLC cache of memory 300 by updating the vMU ID field 322 of entry 328 to include an identifier associated with a set of vMUs allocated to the data item (e.g., "0") and the physical MU ID field 324 of the entry 328 to include an identifier (i.e., a physical address) associated with the first set of MUs (e.g., "10").

In some embodiments, vMU manager 113 can allocate a set of vMUs to a data item by identifying an available set of vMUs of memory 300. For example, vMU manager 113 can obtain the identifier for an available set of vMUs from a memory conversion data structure 350 illustrated in FIG. 3C. Memory conversion data structure 350 can be maintained by memory sub-system controller 115 and can be configured to store a mapping that associates a one or more sets of MUs of the first portion 302 of memory 300 (e.g., the SLC cache) with a set of MUs of the second portion 304 of memory 300 (e.g., the QLC portion of memory 300). Further details regarding memory conversion data structure 350 are provided below.

As described previously, vMU manager 113 can initiate the process to program the data item to the QLC portion of memory in response to receiving a request from host system 120 to store data including the data item to the QLC portion of memory. In some instances, the size of the data of the received request can correspond to a storage capacity of four set block stripes 310 of the SLC cache, which can also correspond to a storage capacity of one block stripe 312 of the QLC portion of memory 300. Before or after receiving the request from host system 120, memory sub-system controller 115 can allocate four block stripes 310 of the SLC cache and one block stripe 312 of the QLC portion of memory 300 to store data received from host system 120. Responsive to allocating the block stripes 310, 312, vMU manager 113 can generate a mapping that associates each of the block stripes 310 of the SLC cache to the block stripe 312 of the QLC portion of memory 300 and store the mapping at memory conversion data structure 350. The mapping between block stripes 310 and block 312 can be included in a SLC MU IDs field 352 and a QLC MU ID field 354 of an entry of data structure 350, as illustrated in FIG. 3C. The mapping can also include an indication of a set of virtual MUs that correspond to each block stripe 310 of the SLC cache, as indicated in a vMU IDs field 356 of the entry. As described above, vMU manager 113 can allocate a set of vMUs to a data item by obtaining an identifier for an available set of vMUs using the memory conversion data structure, in some embodiments. For example, responsive to detecting that data is programmed to a block stripe 310 of the SLC cache, vMU manager 113 can identify the mapping at the memory conversion data structure that corresponds to the block stripe 310 and can determine an identifier for an available set of vMUs based on the identified mapping. VMU manager 113 can generate the mapping between the available set of vMUs and the set of MUs of the SLC cache for storage in the vMU data structure 320, in accordance with previously described embodiments.

VMU manager 113 can generate mappings for each block stripe 310 of the SLC cache that is mapped to a block stripe 312 of the QLC portion of memory and store each generated mapping in a respective entry of vMU data structure 320. As illustrated in FIG. 3B, a first entry of data structure 320 can include a mapping between a first set of vMUs (e.g., associated with vMU ID "0") and a first set of MUs (i.e., associated with physical MU ID "10") of a first block stripe of the SLC cache, a second entry can include a mapping between a second set of vMUs (i.e., associated with vMU ID "1") and a second set of MUs (i.e., associated with physical MU ID "15") of a second block stripe of the SLC cache, and so forth.

In some embodiments, each entry of vMU data structure 320 can further include an access mode field 326. The access mode field 326 can indicate a mode (e.g., a SLC mode, a QLC mode, etc.) for a memory access operation that is performed to access data programmed to the set of MUs associated with a respective entry of data structure 320. In one example, after the data item is programmed to the first set of MUs at the first portion 302 (e.g., the SLC cache) of memory 300, vMU manager 113 can update the access mode field 326 of an entry associated with data item to indicate that the data item is currently associated with a first access mode (e.g., a SLC access mode). After programming the data item to the second set of MUs at the second portion 304 (e.g., the QLC portion) of memory 300 is complete (i.e., after the second pass of the two-pass programming scheme), vMU manager 113 can update the access mode field 326 of the entry to indicate that the data item is currently associated with a second access mode (e.g., a QLC access mode).

At block 214, processing logic adds an entry associated with the data item to a logical-to-physical (L2P) table associated with the memory device. As described herein, a L2P table refers to a data structure that maintains a mapping between each logical address associated with data programmed to memory 300 to an address associated with the set of virtual MUs allocated to the programmed data. In some embodiments, the L2P table associated with the memory device can correspond to L2P table 370 illustrated in FIG. 3D. As illustrated in FIG. 3D, each entry of L2P table 370 can include a logical address field 372 and a physical address field 374. The logical address field 372 of a respective entry can include an indication of a logical address associated with a data item and the physical address field 372 can include an indication of a set of virtual MUs allocated to the data item.

In accordance with embodiments described in the present disclosure, processing logic (e.g., vMU manager 113) can generate a mapping between the logical address associated with the data item programmed to the first set of MUs and an identifier associated with the set of vMUs allocated to the data item. VMU manager 113 can obtain the logical address associated with the data item from host system 120, in some embodiments. For example, host system 120 can include an indication of the logical address associated with the data item with the request to program the data item to the QLC portion of memory 300. In some embodiments, vMU manager 113 can generate the mapping by updating the logical address field 372 of an entry of L2P table 370 to correspond to the logical address associated with the data item and the physical address field 374 of the entry to include the identifier of the set of vMUs allocated to the data item. In an illustrative example, vMU manager 113 can generate entry 376 of L2P table 370 and generate a mapping for one or more data items programmed to memory cells 306 of block stripe 310. As illustrated in FIG. 3D, the logical address field 372 of entry 376 indicates that the one or more data items are associated with the logical address of "0." In accordance with the example provided with respect to FIG. 3B, the one or more data items programmed to memory cells 306 of block stripe 310 can be associated with a particular set of vMUs having the vMU identifier of "0," as indicated by vMU data structure 320. Accordingly, the physical address field 374 of entry 376 can indicate the vMU identifier of "0"

to indicate that the one or more data items are associated with the particular set of vMUs.

It should be noted that although some embodiments describe generating the mapping in a vMU data structure that associates the first physical address associated with the first set of MUs with the set of vMUs allocated to the data item before adding the entry associated with the data item to the L2P table, in some embodiments, the mapping in the vMU data structure 320 can be generated after the entry associated with the data item is added to the L2P table.

Referring back to FIG. 2, at block 216, processing logic detects that the data item is programmed to a second set of MUs associated with the second portion of the memory device. For example, processing logic can detect that the second pass of the two-pass programming scheme to program the data item to the second portion 304 (e.g., the QLC portion) of memory 300 is complete. In response to detecting that the process to program the data item to the second set of MUs is complete, processing logic can update the access mode field 326 of the entry of data structure 320 that corresponds to the data item to indicate that the data item is associated with a second access mode. For example, vMU manager 113 can update the access mode field 326 of entry 328 to indicate that the data item is currently associated with a QLC mode, as illustrated in FIG. 3E.

At block 218, processing logic updates the mapping to associate the set of vMUs with the second physical address associated with the second set of MUs. As illustrated in FIG. 3E, vMU manager 113 can identify an entry of data structure 320 that corresponds to the data item and can update the physical MU ID field 324 of data structure 320 to identify the second physical address associated with the second set of MUs at the second portion 304 of memory 300 (e.g., the QLC portion). As described previously, the size of the data included in the request received from host system 120 can correspond to a storage capacity four block stripes 310 of the SLC cache, which also corresponds to a storage capacity of one block stripe 312 of the QLC portion of memory 300. Accordingly, after the second programming pass of the two-pass programming scheme is completed, the size of the data stored at block stripe 312 of the QLC portion of memory 300 can correspond to the size of data stored at four block stripes 310 of the SLC cache. In such example, vMU manager 113 can update each entry associated with a respective block stripe 310 of the SLC cache to indicate that block stripe 312 now stores such data. For example, as illustrated in FIG. 3E, vMU manager 113 can update the mapping between the block stripes 310 associated with each entry of data structure 320 (i.e., associated with vMU IDs "0," "1," "2," and "3") to correspond to block stripe 312 (i.e., associated with physical MU ID "50").

Figure 3F:
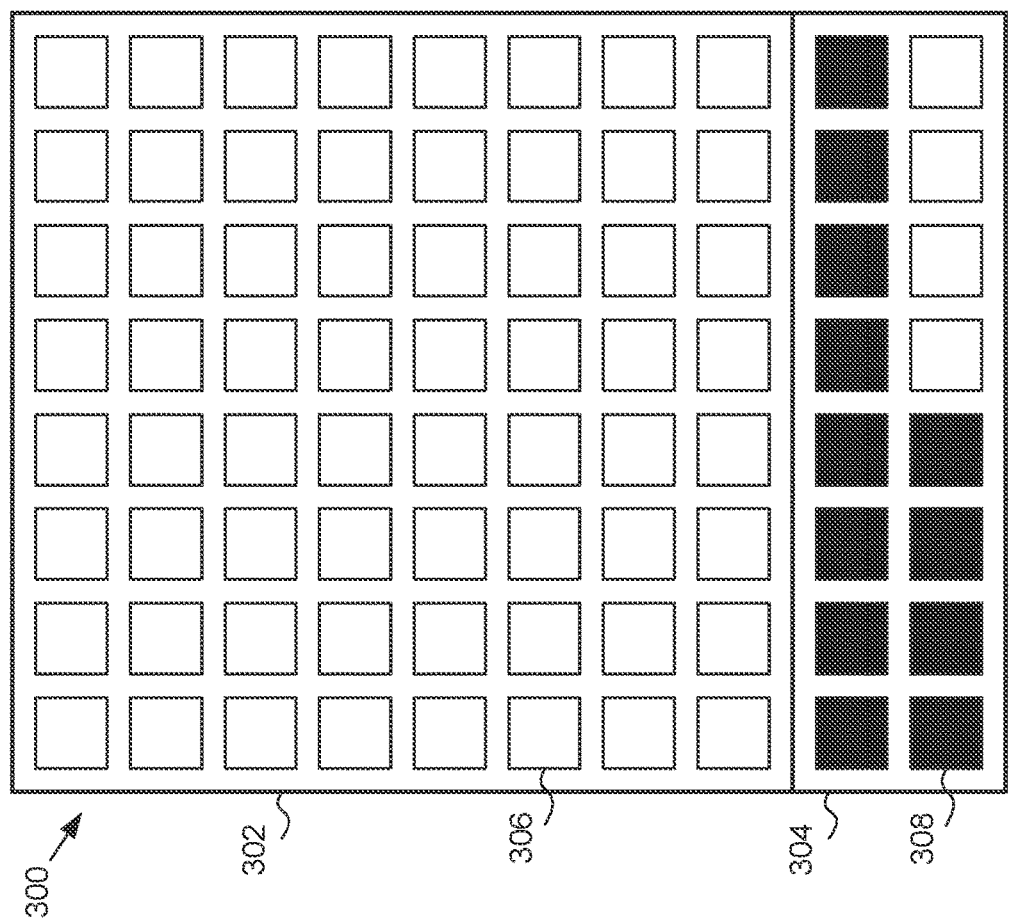

In response to updating the mapping to associate the set of vMUs with the second physical address, vMU manager 113 can erase the data item from the first set of MUs at the first portion 302 of memory 300, as illustrated in FIG. 3F. In some embodiments, memory sub-system controller 115 can invalidate and/or remove the entry of the memory conversion data structure that corresponds to the data item.

Figure 4:
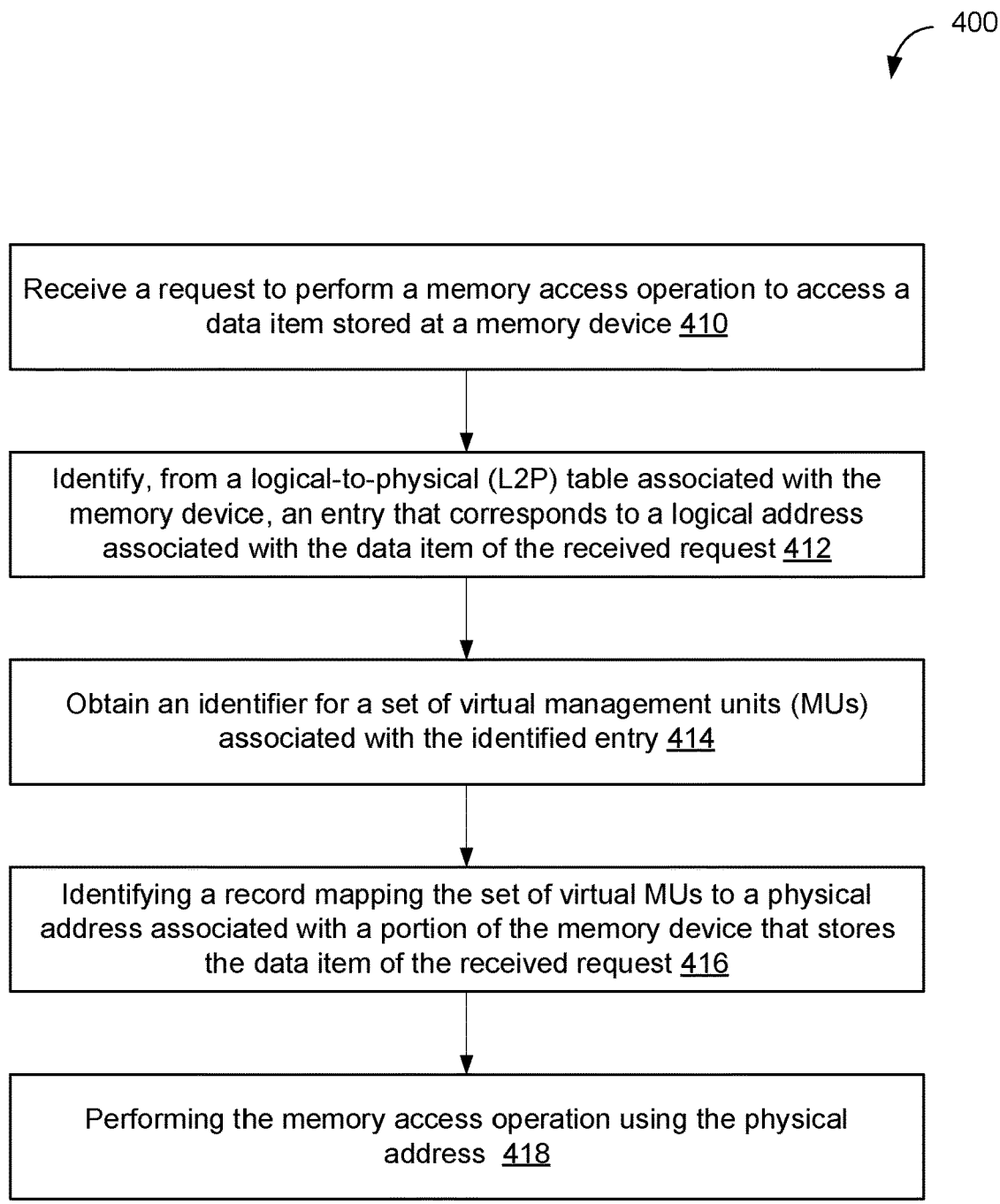
FIG. 4 is a flow diagram for accessing data items residing at a portion of a memory device in accordance with a vMU scheme, in accordance with some embodiments of the present disclosure.

FIG. 4 is a flow diagram of an example method 400 for accessing data items residing at a portion of a memory device in accordance with a vMU scheme, in accordance with some embodiments of the present disclosure. The method 400 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 400 is performed by the vMU manager component 113 of FIG. 1. In other or similar embodiments, one or more operations of method 400 is performed by another component of the memory sub-system controller, or by a component of local media controller 135. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At block 410, processing logic receives a request to perform a memory access operation to access a data item stored at a memory device. A memory access operation can include at least one of a read operation or a write operation. In some embodiments, processing logic can receive the request to perform the memory access operation from host system 120. In some embodiments, the request can include an indication of a logical address associated with the data item.

At block 412, processing logic identifies, from a L2P table associated with the memory device, an entry that corresponds to a logical address associated with the data item of the received request. In some embodiments, the L2P table associated with the memory device can correspond to L2P table 370 described with respect to FIG. 3D. As described above, each entry of L2P table 370 can include a mapping between a logical address associated with a data item (i.e., as indicated by the logical address field 372 of the entry) and an indication of a set of vMUs allocated to the data item (i.e., indicated by the physical address field 374 of the entry). Processing logic can identify an entry of L2P table 370 that corresponds to the logical address associated with the data item based on the values included in the logical address field 372 for one or more entries of the L2P table 370.

At block 414, processing logic obtains an identifier for the set of vMUs associated with the identified entry. Responsive to identifying the entry of the L2P table that corresponds to the data item, processing logic can obtain the identifier for the set of vMUs associated with the data item from the identified entry. As described above, the physical address field 374 of the identified entry can include an identifier of the set of vMUs allocated to the data item. Processing logic can extract the identifier of the set of vMUs from the identified entry.

At block 416, processing logic identifies a record mapping the set of vMUs with physical address associated with a portion of the memory device (e.g., a set of Mus) that stores the data item of the received request. As described above, vMU manager 113 can generate a mapping that associates a set of MUs at memory 300 that store a data item with the set of vMUs associated with memory sub-system 110 allocated to the data item and stores the mapping at vMU data structure 320. Processing logic (e.g., vMU manager 113) can identify a mapping associated with the data item by identifying an entry of vMU data structure 320 that corresponds to the set of vMUs obtained from the entry of the L2P table 370. For example, vMU manager 113 can determine whether a value of the vMU ID field 322 of one or more entries of data structure 320 corresponds to the set of vMUs obtained from the entry of the L2P table at block 414. Responsive to identifying an entry of data structure 320 that corresponds to the set of vMUs associated with the data item, vMU manager 113 can extract an identifier for a physical set of MUs that stores the data item and determine a physical address associated with the MUs.

In some embodiments, the extracted identifier for the physical set of MUs can correspond to a physical address for a portion of the memory 300. For example, the identifier for the physical set of MUs can correspond to a physical block number, which can indicate a physical address for a portion of the memory 300. Accordingly, vMU manager 113 can determine the physical address for the portion of memory 300 that stores the data item based on the extracted identifier for the physical set of MUs. In another example, vMU manager 113 can provide the extracted identifier as an input to a function that is configured to calculate a physical address based on the received input. VMU manager 113 can obtain the output from the function and determine the physical address for the portion of memory 300 based on the obtained output.

At block 418, processing logic performs the memory access operation using the physical address. Processing logic can identify one or more memory cells of the portion of memory 300 that correspond to the determined physical address and perform the memory access operation at the one or more memory cells. As described above, in some embodiments, each entry of vMU data structure can include an access mode field 326 that indicates a mode for a memory access operation that is to be performed to access data programmed to memory cells associated with a respective set of MUs. For example, as indicated in FIGS. 3B and 3E, the access mode can correspond to a SLC access mode or a QLC access mode, in some embodiments. VMU manager 113 can determine an access mode associated with the set of MUs that stores the data item based on the identified entry of vMU data structure 320 and perform the memory access operation in accordance with the determined access mode.

In an illustrative example, vMU manger 113 can receive a request to perform a memory access operation (e.g., a read operation) to access a data item stored at memory 300 after the data item has been programmed to a SLC cache of memory 300 and before a second pass of a two-pass programming scheme to program the data item to a QLC portion of memory 300 is complete. Responsive to receiving the request, vMU manager 113 can identify an entry of L2P table 370 that corresponds to the requested data item. For the purpose of such illustrative example, the logical address associated with the data item can be logical address "0," however, other logical addresses can be associated with the data item.

VMU manager 113 can obtain an identifier for a set of vMUs associated with memory 300 based on the logical address associated with the data item. In such illustrative example, vMU manger 113 can determine that the value of the identifier for the set of vMUs is "0" based on the mapping stored at L2P table 370, as illustrated in FIG. 3D. VMU manager 113 can determine a set of MUs of memory 300 that stores the data item based on a mapping between the set of MUs and the set of vMUs at vMU data structure 320. As illustrated in FIG. 3B, vMU manager 113 can determine that the value of the identifier for the set of MUs of memory 300 that stores the data item is "10" based on the mapping stored at vMU data structure 320. Because the request was received after the data item was programmed to the SLC cache and before the second pass of the two-pass programming scheme is complete, the determined set of MUs of memory 300 correspond to memory cells included in the SLC cache at a first portion of memory 300. VMU manager 113 can also determine that the access mode associated with the determined set of MUs is a SLC access mode based on the value included in the access mode field 326 of the entry of vMU data structure 320. Responsive to obtaining the identifier for the set of MUs and the access mode associated with the set of MUs, vMU manager 113 can determine the physical address associated with the set of MUs and perform the memory access operation at the memory cells associated with the determined physical address in accordance with the determined access mode.

In another illustrative example, vMU manager 113 can receive a request to perform a memory access operation to access a data item after the second pass of the two-pass programming scheme is complete. VMU manager 113 can determine the identifier for the set of vMUs associated with memory 300 and can determine the set of MUs of memory 300 that stores the data item, as described above. As illustrated in FIG. 3D, vMU manager 113 can determine that the value of the identifier for the set of MUs of memory 300 that stores the data item is "50." Because the request was received after the second pass of the two-pass programming scheme is complete, the determined set of MUs of memory 300 correspond to memory cells included in the QLC portion of memory 300. VMU manger 113 can also determine that the access mode associated with the determined set of MUs is a QLC access mode. VMU manager 113 can perform the memory access operation at memory cells associated with a physical address corresponding to the determined set of MUs in accordance with the QLC access mode.

Figure 5:
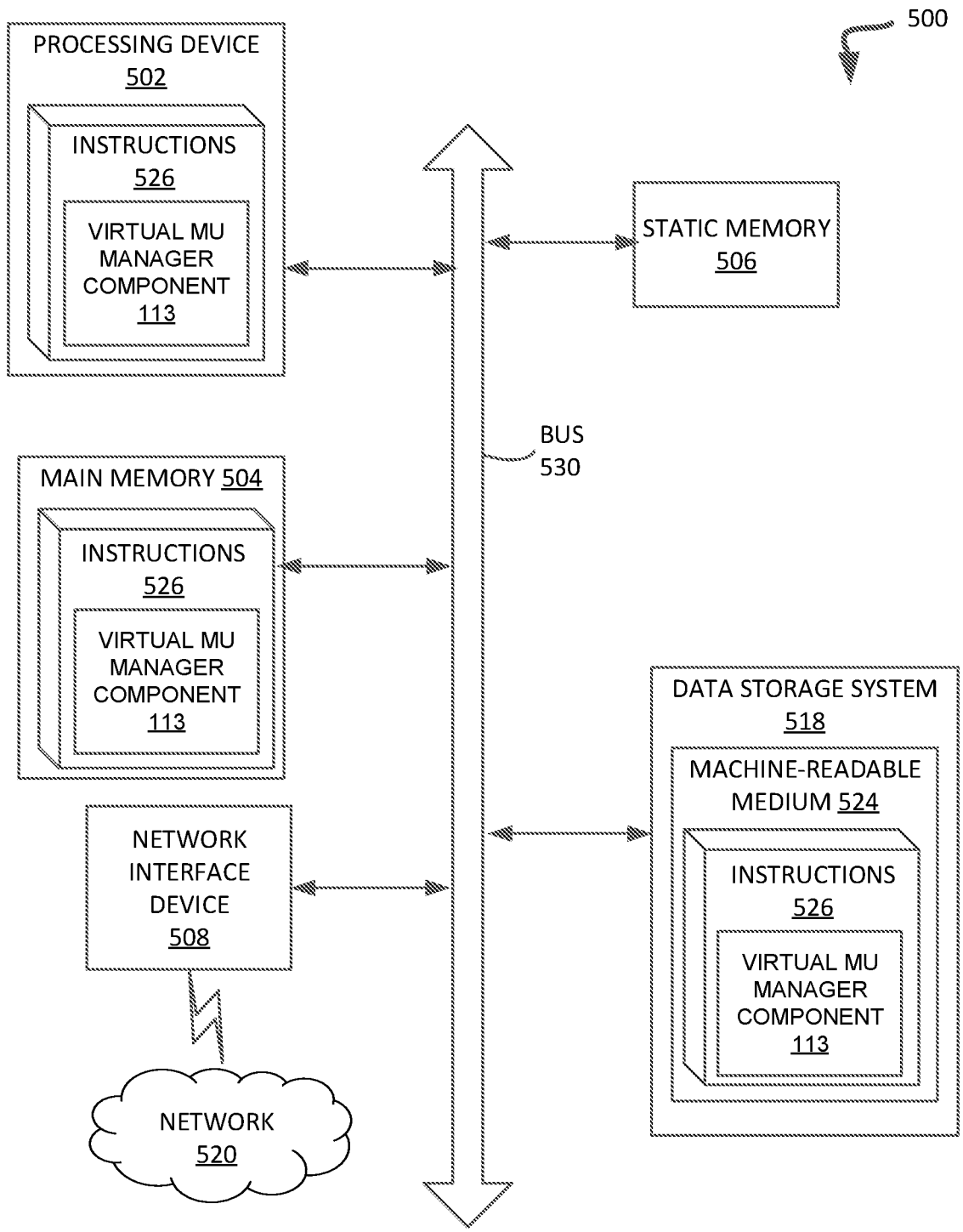
FIG. 5 is a block diagram of an example computer system in which embodiments of the present disclosure may operate.

FIG. 5 illustrates an example machine of a computer system 500 within which a set of instructions, for causing the machine to perform any one or more of the methodologies discussed herein, can be executed. In some embodiments, the computer system 500 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the vMU manager component 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 500 includes a processing device 502, a main memory 504 (e.g., read-only memory (ROM), flash memory, dynamic random access memory (DRAM) such as synchronous DRAM (SDRAM) or RDRAM, etc.), a static memory 506 (e.g., flash memory, static random access memory (SRAM), etc.), and a data storage system 518, which communicate with each other via a bus 530.

Processing device 502 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 502 can also be one or more special-purpose processing devices such as an application specific integrated circuit (ASIC), a field programmable gate array (FPGA), a digital signal processor (DSP), network processor, or the like. The processing device 502 is configured to execute instructions 526 for performing the operations and steps discussed herein. The computer system 500 can further include a network interface device 508 to communicate over the network 520.

The data storage system 518 can include a machine-readable storage medium 524 (also known as a computer-readable medium) on which is stored one or more sets of instructions 526 or software embodying any one or more of the methodologies or functions described herein. The instructions 526 can also reside, completely or at least partially, within the main memory 504 and/or within the processing device 502 during execution thereof by the computer system 500, the main memory 504 and the processing device 502 also constituting machine-readable storage media. The machine-readable storage medium 524, data storage system 518, and/or main memory 704 can correspond to the memory sub-system 110 of FIG. 1.

In one embodiment, the instructions 526 include instructions to implement functionality corresponding to a voltage bin boundary component (e.g., the vMU manager component 113 of FIG. 1). While the machine-readable storage medium 524 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method comprising:
responsive to receiving a request from a host system to program a data item to one or more memory devices, performing one or more operations to program the data item to a first set of physical management units (MUs) associated with a first portion of one or more memory devices of a memory sub-system and a second set of physical MUs associated with a second portion of the one or more memory devices, wherein the first portion comprises memory cells of a first type and the second portion comprises memory cells of a second type, wherein the first set of physical MUs is associated with a first physical address of the one or more memory devices, and wherein the second set of physical MUs is associated with a second physical address of the one or more memory devices;

generating, in a virtual MU data structure, a mapping that associates the first physical address of the one or more memory devices with a set of virtual MUs associated with the one or more memory devices, wherein the set of virtual MUs correspond to one or more block stripes of the memory sub-system;

adding an entry associated with the data item to a logical-to-physical (L2P) table associated with the one or more memory devices, wherein the entry comprises an identifier associated with the set of virtual MUs;

detecting that programming the data item to the second set of physical MUs by the one or more operations is completed; and responsive to the detecting, updating the mapping of the virtual MU data structure to associate the set of virtual MUs with the second physical address.

2. The method of claim 1, further comprising:
determining that the set of virtual MUs is available for allocation to the data item; and
updating a first field of an entry to the virtual MU data structure to include the mapping between the set of virtual MUs and the first physical address.

3. The method of claim 2, wherein updating the mapping to associate the set of virtual MUs with the second physical address comprises:
updating the first field of the entry of the virtual MU data structure to include the mapping between the set of virtual MUs and the second physical address.

4. The method of claim 3, wherein the entry of the virtual MU data structure further comprises a second field that includes an indication of whether the data item is programmed to memory cells of the first type or memory cells of the second type, and wherein the method further comprises:
responsive to adding the entry to the virtual MU data structure, setting the second field of the entry to indicate that the data item is programmed to memory cells of the first type; and
responsive to updating the first field of the entry of the virtual MU data structure to include the mapping between the set of virtual MU and the second physical address, updating the second field of the entry to indicate that the data item is programmed to memory cells of the second type.

5. The method of claim 1, further comprising:
programming the data item to the second set of physical MUs in accordance with a first pass programming operation of a two-pass programming scheme associated with the memory device, and wherein detecting that the data item is programmed to the second set of physical MUs comprises determining that a second pass programming operation of the two-pass programming scheme is complete.

6. The method of claim 5, further comprising:
responsive to detecting that the data item is programmed to the second set of physical MUs in accordance with the first pass programming operation, updating an entry of a memory conversion data structure to include a mapping associating the first set of physical MUs with the second set of physical MUs and the set of virtual MUs.

7. The method of claim 6, further comprising:
responsive to detecting that the data item is programmed to the second set of physical MUs, erasing the entry of the memory conversion data structure.

8. The method of claim 1, wherein the memory cells of the first type comprise single level cells (SLCs) and the memory cells of the second type comprise at least one or more of multi-level cells (MLCs), triple-level cells (TLCs) or quadruple-level cells (QLCs).

9. A system comprising
one or more memory devices; and
a processing device coupled to each of the one or more memory devices, the processing device to perform operations comprising:
receiving a request to perform a memory access operation to access a data item stored at the one or more memory devices, wherein the memory access operation comprises at least one of a read operation or a write operation;
responsive to identifying, in a logical-to-physical (L2P) table associated with the one or more memory devices, an entry that corresponds a logical address associated with the data item of the received request, obtaining an identifier for a set of virtual management units (MUs) associated with the one or more memory devices from the identified entry, wherein the set of virtual MUs correspond to one or more block stripes across the one or more memory devices;
identifying, in a virtual MU data structure, a record mapping the set of virtual MUs to a physical address associated with a portion of the one or more memory devices that stores the data item of the received request; and
performing the memory access operation using the physical address to access the data item stored at the one or more memory devices in accordance with the request.

10. The system of claim 9, wherein identifying the record mapping the set of virtual MUs to the physical address associated with a portion of the one or more memory devices that stores the data item of the received request comprises:
determining that an entry of the virtual MU data structure includes the mapping between at least the set of virtual MUs and a set of physical MUs of the one or more memory devices that stores the data item; and
extracting the physical address from the entry of the virtual MU data structure.

11. The system of claim 10, wherein the entry of the virtual MU data structure comprises an indication of whether the data item is programmed to memory cells of a first type or memory cells of a second type, and wherein the memory access operation is performed to access the data item at the physical address in view of the indication.

12. The system of claim 11, wherein the memory cells of the first type comprise single level cells (SLCs) and the memory cells of the second type comprise at least one or multi-level cells (MLCs), triple-level cells (TLCs) or quadruple-level cells (QLCs).

13. The system of claim 9, wherein the one or more memory devices comprise a first portion and a second portion, the first portion comprising memory cells associated with a first type and the second portion comprising memory cells of a second type, and wherein the request to perform the memory access operation is received before a completion of a process to program the data item to a set of physical MUs associated with the second portion of the memory device.

14. A non-transitory computer-readable storage medium comprising instructions that, when executed by a processing device, cause the processing device to perform operations comprising:

responsive to receiving a request from a host system to program a data item to one or more memory devices, performing one or more operations to program the data item to a first set of physical management units (MUs) associated with a first portion of one or more memory devices of a memory sub-system and a second set of physical MUs associated with a second portion of the one or more memory devices, wherein the first portion comprises memory cells of a first type and the second portion comprises memory cells of a second type, wherein the first set of physical MUs is associated with a first physical address of the one or more memory devices, and wherein the second set of physical MUs is associated with a second physical address of the one or more memory devices;

generating, in a virtual MU data structure, a mapping that associates the first physical address of the one or more memory devices with a set of virtual MUs associated with the one or more memory devices, wherein the set of virtual MUs correspond to one or more block stripes of the memory sub-system;

adding an entry associated with the data item to a logical-to-physical (L2P) table associated with the one or more memory devices, wherein the entry comprises an identifier associated with the set of virtual MUs;

detecting that programming the data item to a second set of physical MUs by the one or more operations is completed, and responsive to the detecting, updating the mapping of the virtual MU data structure to associate the set of virtual MUs with the second physical address.

15. The non-transitory computer-readable storage medium of claim 14, wherein the operations further comprise:

determining that the set of virtual MUs is available for allocation to the data item; and updating a first field of an entry to the virtual MU data structure to include the mapping between the set of virtual MUs and the first physical address.

16. The non-transitory computer-readable storage medium of claim 15, updating the mapping to associate the set of virtual MUs with the second physical address comprises:

updating the first field of the entry of the virtual MU data structure to include the mapping between the set of virtual MUs and the second physical address.

17. The non-transitory computer-readable storage medium of claim 16, wherein the entry of the virtual MU data structure further comprises a second field that includes an indication of whether the data item is programmed to memory cells of the first type or memory cells of the second type, and wherein the operations further comprise:

responsive to adding the entry to the virtual MU data structure, setting the second field of the entry to indicate that the data item is programmed to memory cells of the first type; and responsive to updating the first field of the entry of the virtual MU data structure to include the mapping between the set of virtual MU and the second physical address, updating the second field of the entry to indicate that the data item is programmed to memory cells of the second type.

18. The non-transitory computer-readable storage medium of claim 14, wherein the operations further comprise:

programming the data item to the second set of physical MUs in accordance with a first pass programming operation of a two-pass programming scheme associated with the memory device, and wherein detecting that the data item is programmed to the second set of physical MUs comprises determining that a second pass programming operation of the two-pass programming scheme is complete.

19. The non-transitory computer-readable storage medium of claim 18, wherein the operations further comprise:

responsive to detecting that the data item is programmed to the second set of physical MUs in accordance with the first pass programming operation, updating an entry of a memory conversion data structure to include a mapping associating the first set of physical MUs with the second set of physical MUs and the set of virtual MUs.

* * * * *